United States Patent
Langwald et al.

(10) Patent No.: US 8,960,370 B2
(45) Date of Patent: Feb. 24, 2015

(54) DRAIN VALVE

(75) Inventors: Olaf Langwald, Neukirch-Bernried (DE); Frank Schuhmacher, Ravensburg (DE); Ulf Lang, Salem (DE)

(73) Assignee: ZF Friedrichshafen AG, Friedrichshafen (DE)

(*) Notice: Subject to any disclaimer, the term of this patent is extended or adjusted under 35 U.S.C. 154(b) by 415 days.

(21) Appl. No.: 13/419,676

(22) Filed: Mar. 14, 2012

(65) Prior Publication Data

US 2012/0241452 A1  Sep. 27, 2012

(30) Foreign Application Priority Data

Mar. 22, 2011 (DE) .......................... 10 2011 005 879

(51) Int. Cl.
| | | |
|---|---|---|
| B65D 39/08 | (2006.01) | |
| B65D 53/00 | (2006.01) | |
| F16K 31/44 | (2006.01) | |
| F01M 11/04 | (2006.01) | |
| F16K 1/04 | (2006.01) | |
| F16K 24/04 | (2006.01) | |

(52) U.S. Cl.
CPC .............. *F01M 11/0408* (2013.01); *F16K 1/04* (2013.01); *F16K 24/04* (2013.01)
USPC ........................................................ 184/1.5

(58) Field of Classification Search
USPC ............... 184/1.5, 105.3, 106; 123/196 R
See application file for complete search history.

(56) References Cited

U.S. PATENT DOCUMENTS

2009/0101440 A1* 4/2009 Morgan ......................... 184/1.5

FOREIGN PATENT DOCUMENTS

| DE | 1 192 455 | 6/1965 |
|---|---|---|
| DE | 30 42 969 A1 | 7/1982 |
| DE | 10 2006 004 520 A1 | 10/2007 |
| DE | 10 2008 058 411 A1 | 5/2010 |
| GB | 1 034 239 | 6/1966 |

* cited by examiner

*Primary Examiner* — William E Dondero
*Assistant Examiner* — Mark K Buse
(74) *Attorney, Agent, or Firm* — Davis & Bujold, PLLC; Michael J. Bujold

(57) ABSTRACT

A drain valve for draining liquid out of a container which comprises an essentially cylindrical opening that passes through a thickened area of the container wall, with an internally threaded section formed at an outer end thereof, followed by an interior space with a larger diameter into which a duct opens, and opposite the interior space an inner section with a smaller diameter opens into the container. A step is provided between the interior space and the inner section and serves as the seat for an associated end face of the valve element. A step between the interior space and the bore, on the one hand, and the inner end face of the valve element, on the other hand, are designed to co-operate as a valve seat which progressively opens and closes as the valve element is displaced.

19 Claims, 2 Drawing Sheets

DRAIN VALVE

This application claims priority from German patent application serial no. 10 2011 005 879.6 filed Mar. 22, 2011.

FIELD OF INVENTION

The invention concerns a drain valve for draining liquid out of a container or suchlike, for example draining oil out of a transmission.

BACKGROUND OF THE INVENTION

Generally known are simple threaded plugs which can be screwed into a drainage opening made as a threaded bore in the wall of a container. It is considered to be a particular disadvantage of such threaded plugs that they do not allow quantitatively regulated draining of the liquid, since they either leave the drainage opening completely clear, or closed, at least to a large extent.

Also known are oil drainage fittings usually in the form of drain taps, which are screwed from the outside all the way into the drainage opening in the form of a threaded bore formed in the wall of the container. Since such oil drainage fittings project a long way out from the wall of the container, substantial additional fitting space must be left clear for them, apart from the fact that such fittings also risk being damaged. A further disadvantage is considered to be that there can exist a risk of leakage between the screwed-in fitting and the threaded bore.

From US 2009/0101440 A1 a drain valve for draining a liquid out of a container is known, which has an essentially cylindrical opening that passes through a thickened area of the container wall, with a threaded section at its outer end which in provided with an internal thread, this section being followed by an interior space with a larger diameter into which a duct opens, and with an inner section opposite the interior space which has a smaller diameter and opens into the container, the step between the interior space and the inner section serving as the seat for an associated end face of a valve element. The inner section is provided with an internal thread which receives an extension formed on the inner end of the valve element and is provided with an external thread, this extension acting essentially as a stopper but one that does not allow quantitatively regulated draining of the oil. For draining purposes the known valve element must first be unscrewed a great distance before it allows oil to pass through in a more or less uncontrolled manner. Moreover, this known design is expensive and elaborate to produce, since two respective aligned threaded sections with different thread diameters have to be made for both the valve housing and for the valve element.

SUMMARY OF THE INVENTION

Against this background the purpose of the present invention is to provide a drain valve which allows quantitatively regulated draining of the liquid and which is simply designed and can be produced by simple technical means.

The invention is based on the recognition that a continuous displacement of the valve element should be used for the progressive opening or closing of a run-off path for the liquid, and hence for quantitatively regulated draining.

Accordingly, the invention starts from a drain valve for draining liquid out of a container or the like, which comprises an essentially cylindrical opening that passes through a thickened area of the container wall, with a threaded section at its outer end which is provided with an internal thread, this being followed by an interior space with a larger diameter into which a duct opens, and with an inner section opposite the interior space which has a smaller diameter and opens into the container, the step between the interior space and the inner section which serves as the seat for an associated end face of a valve element.

To achieve the set objective it is provided in this case that the inner section is formed as a smooth bore and that the step between the interior space and the bore, on the one hand, and the inner end face of the valve element, on the other hand, are designed to co-operate as a valve seat which opens or closes progressively as the valve element is displaced.

The step between the interior space and the bore, on the one hand, and the end face of the valve element, on the other hand, are so designed that between them there is formed a run-off path of smoothly varying cross-section which forms a connection from an inlet to an outlet, as will be represented in detail with reference to example embodiments.

Basically, drain valves can serve to drain liquid from a container to the outside or from a first part of a container into a second part thereof. In the first case, according to the invention it is provided that the bore is designed and serves as an inlet from the inside of the container and the duct connected to the interior space as an outlet to the external surroundings. In the other case it is provided that the duct connected to the interior space is designed and serves as the inlet from a separate, first container area and the bore as the outlet into a second container area, as will be represented in more detail with reference to an example embodiment.

According to a further design feature of the invention, co-operating abutment means are formed on the valve element, on the one hand, and in the interior space, on the other hand, which restrict the displacement path of the valve element to a predetermined maximum opening position. In this way, on the one hand the maximum extent of opening is determined and on the other hand inadvertent complete removal of the valve element from the valve housing is securely prevented.

According to the invention the abutment means comprises a circlip or the like that is arranged around the outer circumference of the valve element, and a step that co-operates with it, which is formed on an inside wall of the interior space.

To prevent the escape of liquid between the valve housing and the valve element, according to a further design feature of the invention, sealing means are provided between the inside wall of the interior space and the valve element. The sealing means comprises, for example, at least one O-ring arranged around the outer circumference of the valve element, which is in contact with the inside wall of the interior space.

Particularly in the case of a drain valve through which a liquid is drained to the outside, according to a further design feature of the invention it is provided that elastic sealing means are arranged between the inner end face of the valve element and the valve seat consisting of the step formed by the transition from the interior space to the bore, the means securely preventing any outward escape of the liquid.

BRIEF DESCRIPTION OF THE DRAWINGS

The invention will now be explained in more detail with reference to a number of example embodiments. For this purpose the description includes attached drawings which show.

DETAILED DESCRIPTION OF THE PREFERRED EMBODIMENTS

Figure 1:
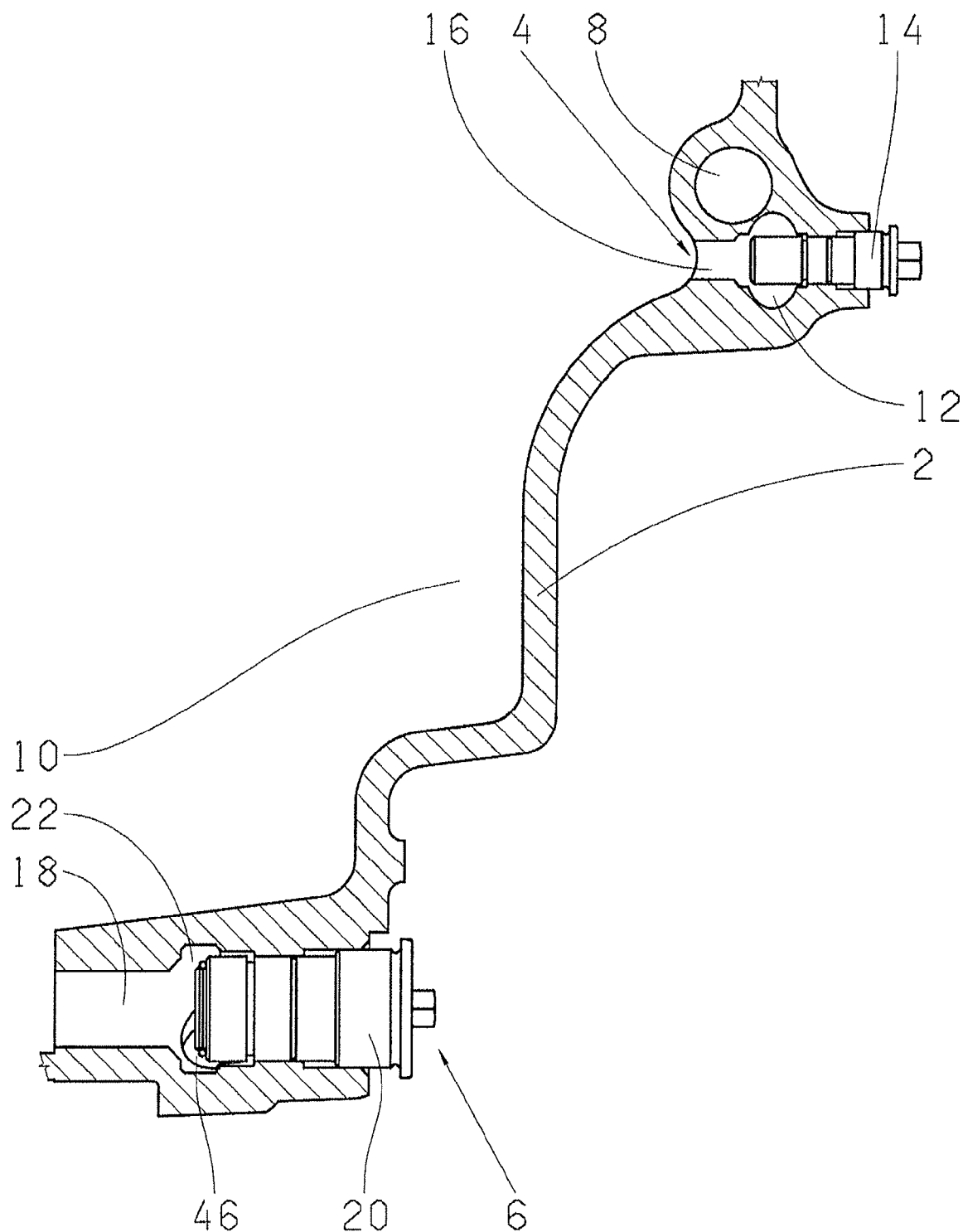
FIG. 1: A section through a container wall with two drain valves integrated therein.

FIG. 1 shows the wall 2 of a container, in this case a transmission housing, in which two drain valves 4 and 6 are integrated. The upper drain valve 4 facilitates so-termed internal draining whereby, for example, oil present in an upper container area (not shown) or in ducts connected thereto can be drained into a lower, main oil chamber 10. The duct 8, serving as an inlet, communicates with the interior space 12 of the drain valve which, by means of the valve element 14, can optionally be connected to a bore 16 that serves as an outlet and opens into the main oil chamber 10, or separated from it.

The lower drain valve 6 serves for so-termed outside draining, i.e. for draining the oil present in the main oil chamber 10 to the outside. For this purpose the bore 18, which is connected to the main oil chamber 10 and which serves as an inlet, can optionally be connected by means of the valve element 20 to the interior space 22 into which a duct 46 that serves as an outlet opens, or separated from it.

Figure 2:
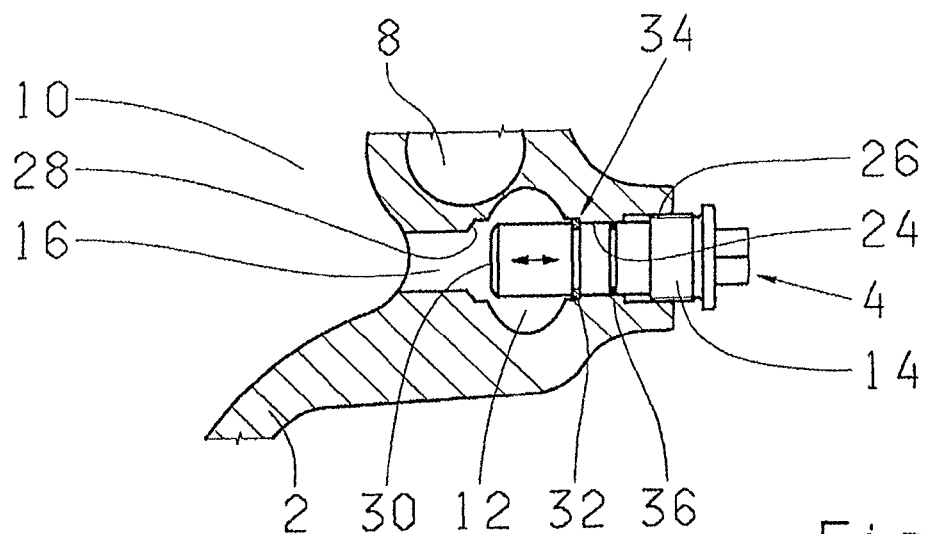
FIG. 2: The upper drain valve in FIG. 1, shown on a larger scale.

FIG. 2 shows an enlarged representation of the upper drain valve 4. The valve housing is formed as an integral part of the wall 2 of the container. In the area of the drain valve 4 the wall 2 has a thickened portion in which is formed an essentially cylindrical interior space 12 which accommodates the also essentially cylindrical valve element 14, allowing it to move axially. For this purpose, on the one hand the valve element 14 on its outer circumference and on the other hand an inside wall 24 of the interior space 12 are provided with co-operating threads 26, so that the valve element 14 can be displaced axially by rotating it with the aid of a tool applied to it axially from the outside. On the inside of the container the interior space 12 is followed, moving inward, i.e. toward the main oil chamber 10, by a coaxial bore 16 with a smaller diameter which is open toward the inside. The step 28 at the transition from the interior space 12 to the bore 16 serves as a valve seat for the inner end face 30 of the valve element 14.

FIG. 2 shows the drain valve 4 in its open position, such that oil can flow from the duct 8 by way of the interior space 12 and the bore 16 into the main oil chamber 10, so that if necessary further container spaces or ducts higher up and connected to the duct 8 can be drained into the main oil chamber in a quantitatively regulated manner. Thus, the duct 8 serves in this case as the inlet and the bore 16 as the outlet of the drain valve 4.

Around the outside circumference of the valve element 14 is arranged for example a circlip 32, which in the position of maximum opening of the valve element 14 shown, rests in contact with a step 34 formed on the inner circumference of the inside wall 24, whereby abutment means are provided which prevent screwing the valve element completely out.

To prevent leakage to the outside, around the outer circumference of the valve element 14 sealing means are also arranged, for example in the form of at least one O-ring 36, which is in contact with the inner circumference of the inside wall 24.

Figure 3:
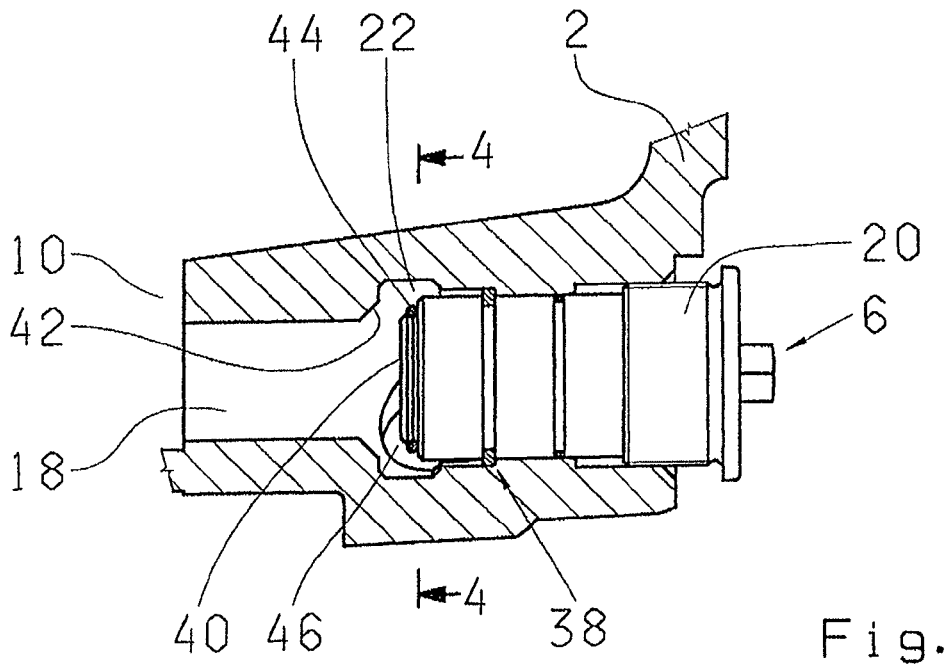
FIG. 3: The lower drain valve in FIG. 1, shown in more detail.

FIG. 3 shows further details of the lower drain valve 6 in FIG. 1. The valve housing integrated in the housing wall 2 and the valve element 20 accommodated therein correspond in their functions to the functions described with reference to FIG. 2, so there is no need for further detailed explanation.

The drain valve 6 is also shown in its fully open position restricted by means 38 to prevent it from being screwed out, so the inner end face of the valve element 20 is clear of the associated valve seat 42.

In contrast to FIG. 2, in this case the bore 18 serves as an inlet and the duct 46 connected to the interior space 22 as an outlet, so that when the drain valve 6 is open oil can drain out of the main oil chamber 10 to the outside.

To ensure the preventing of outward leakage when the drain valve 6 is closed, elastic sealing means 44 for example in the form of an O-ring are arranged on the inner end face 40 of the valve element 20, to ensure reliable sealing.

Figure 4:
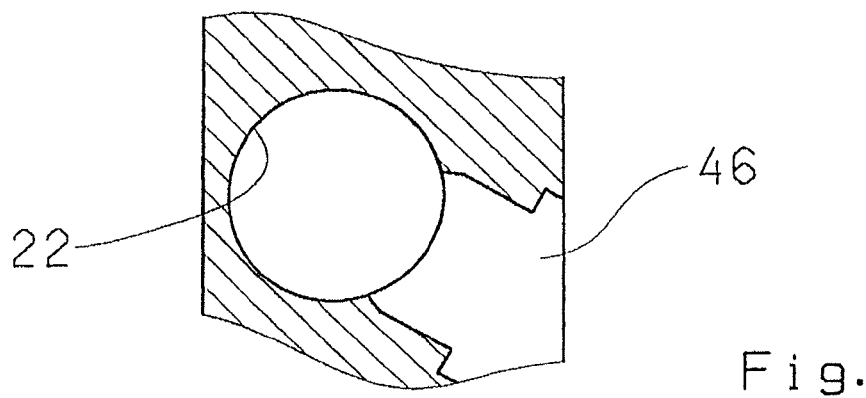
FIG. 4: A section through the arrangement shown in FIG. 3, along the section line 4-4.

FIG. 4 shows a section corresponding to the section line 4-4 in FIG. 3, in which can be seen an interior space 22 that accommodates a valve element and the duct 46 that branches off from this and leads to the outside surroundings. To the duct 46 can be connected, for example, an oil drainage pipe or the like.

INDEXES

2 Wall
4 Upper drain valve
6 Lower drain valve
8 Duct
10 Main oil chamber
12 Interior space
14 Valve element
16 Bore
18 Bore
20 Valve element
22 Interior space
24 Inside wall
26 Threads
28 Step
30 Inner end face
32 Circlip
34 Step
36 O-ring
38 Screw-out prevention means
40 Inner end face
42 Valve seat
44 Sealing means
46 Duct

The invention claimed is:

1. A drain valve for draining liquid out of a container, the drain valve comprising:
   an substantially cylindrical opening through a thickened area of a container wall (2), with an internally threaded section formed adjacent an axially outer end thereof, followed by a larger dimensioned interior space into which a duct opens and communicates, followed by a smaller diameter inner section,
   a step being provided between the larger dimensioned interior space and the smaller diameter inner section,
   an end of the inner section, opposite the interior space, opening into and communicating with the container,
   a valve element (14, 18) being received within the cylindrical opening and threadedly engaging with the internally threaded section, and a leading end of the valve element being cylindrical and supporting an inner end face,
   the step, located between the interior space and the inner section, serving as a valve seat for engagement with the inner end face of the valve element, the inner section being formed as a smooth bore (16, 18), and the drain valve progressively opens and closes as the valve element is axially displaced relative to the container wall (2).

2. The drain valve according to claim 1, wherein the bore (18) is designed and serves as an inlet from inside of the container, and the duct as an outlet to an external surrounding.

3. The drain valve according to claim 1, wherein the duct (8) is designed and serves as an inlet from a separate, first container area and the bore (16) as an outlet into a second container area.

4. The drain valve according to claim 1, wherein co-operating abutment means (32, 34) are provided on the valve element (14) and in the interior space (12), which restrict displacement of the valve element (14) to a predetermined maximum open position.

5. The drain valve according to claim 4, wherein the abutment means comprises a circlip (32) arranged around an outside circumference of the valve element (14) and a step (34) formed on an inside wall (24) of the interior space.

6. The drain valve according to claim 1, wherein sealing means, for sealing the interior space (12) relative to the outside, are provided between an inside wall (24) of the interior space and the valve element (14).

7. The drain valve according to claim 6, wherein the sealing means comprise at least one O-ring (36) arranged around an outside circumference of the valve element (14) which contacts the inside wall (24) of the interior space.

8. The drain valve according to claim 1, wherein elastic sealing means (44) are provided between the inner end face (40) of the valve element (20) and the valve seat (42).

9. The drain valve according to claim 1, wherein a diameter of the inner end face is smaller than a diameter of the cylindrical opening but larger than a diameter of the inner section.

10. A drain valve for draining liquid out of a container, the drain valve comprising:

a cylindrical opening passing through a thickened area of a container wall (2), an internally threaded section being formed adjacent an axially outer end of the cylindrical opening, an inner section of the cylindrical opening being spaced from the internally threaded section by an interior space which has a larger diameter in comparison to the inner section, a duct opening into the interior space and communicating with an exterior of the container, the inner section opening into an interior of the container, a valve element (14, 18) being received within the cylindrical opening and threadedly engaging with the internally threaded section, and a leading end of the valve element being cylindrical and supporting an inner end face, a step being formed in the cylindrical opening axially between the interior space and the inner section, and the step forming a seat for engagement with the inner end face of a valve element, the inner section being formed as a smooth bore (16), and the valve element being axially displaced within the cylindrical opening by rotation thereof, relative to the container wall (2), to progressively open and close a flow of the liquid from the interior of the container to the exterior of the container.

11. The drain valve according to claim 10, wherein the bore (18) serves as an inlet from inside of the container and the duct serves as an outlet to an external surrounding.

12. The drain valve according to claim 10, wherein the duct (8) serves as an inlet from a separate, first container area and the bore (16) serves as an outlet into a second container area.

13. The drain valve according to claim 10, wherein co-operating abutment mechanisms (32, 34) are provided on the valve element (14) and in the interior space (12) to restrict displacement of the valve element (14) to a predetermined maximum open position.

14. The drain valve according to claim 10, wherein the abutment mechanism comprises a circlip (32) arranged around an outside circumference of the valve element (14) and a step (34) formed on an inside wall (24) of the interior space.

15. The drain valve according to claim 10, wherein a seal seals the interior space (12) relative to the outside and is located between an inside wall (24) of the interior space and the valve element (14).

16. The drain valve according to claim 15, wherein the seal comprises at least one O-ring (36) arranged around an outside circumference of the valve element (14) which contacts the inside wall (24) of the interior space.

17. The drain valve according to claim 10, wherein an elastic seal is located between the inner end face (40) of the valve element (20) and the valve seat (42).

18. The drain valve according to claim 10, wherein a diameter of the inner end face is smaller than a diameter of the cylindrical opening but larger than a diameter of the inner section.

19. A drain valve for draining liquid from of a container, the drain valve comprising:

a cylindrical opening being formed through a thickened area of a container wall (2), and the cylindrical opening having an internally threaded section formed therein, the cylindrical opening communicating with a larger dimensioned interior space, and the larger dimensioned interior space communicating with a duct, the larger dimensioned interior space communicating with a smaller diameter inner section, a reduction step being provided between the larger dimensioned interior space and the smaller diameter inner section, an end of the inner section, opposite the interior space, communicating with the container, a valve element (14, 18) being received within the cylindrical opening and threadedly engaging with the internally threaded section, and a leading end of the valve element being cylindrical and supporting an inner end face having a diameter larger than a diameter of the inner section, the reduction step, located between the interior space and the inner section, serving as a valve seat for engagement with the inner end face of the valve element and preventing flow of the liquid through the inner section, and the drain valve seat progressively opens and closes as the valve element is axially displaced, relative to the container wall (2), to control the flow of the liquid through the inner section.

* * * * *